United States Patent
Richardson

(10) Patent No.: US 6,750,398 B1
(45) Date of Patent: Jun. 15, 2004

(54) APPARATUS FOR RECESSING AN ELECTRICAL DEVICE IN A WALL

(76) Inventor: Michael T. Richardson, Entratech Systems Inc. / 202 E. Fox Rd., Sandusky, OH (US) 44870

( * ) Notice: Subject to any disclaimer, the term of this patent is extended or adjusted under 35 U.S.C. 154(b) by 0 days.

(21) Appl. No.: 10/106,080

(22) Filed: Mar. 26, 2002

(51) Int. Cl.[7] ................................................ H01H 9/02
(52) U.S. Cl. ........................... 174/58; 174/50; 174/53; 174/66; 220/241; 220/3.8; 33/528
(58) Field of Search ............................. 174/58, 66, 67, 174/48, 50, 53; 220/241, 242, 3.8; 33/528

(56) References Cited

U.S. PATENT DOCUMENTS

| | | | | |
|---|---|---|---|---|
| 3,378,160 A | * | 4/1968 | Bassani ........................ | 174/58 |
| 4,835,343 A | * | 5/1989 | Graef et al. .................. | 174/66 |
| 5,723,817 A | * | 3/1998 | Arenas et al. ................ | 174/66 |
| 6,147,304 A | * | 11/2000 | Doherty ..................... | 174/58 X |
| 6,166,329 A | * | 12/2000 | Oliver et al. ................. | 174/58 |
| 6,346,674 B1 | * | 2/2002 | Gretz ............................ | 174/58 |
| 6,376,770 B1 | * | 4/2002 | Hyde ........................... | 174/58 |

* cited by examiner

*Primary Examiner*—Dhiru R Patel
(74) *Attorney, Agent, or Firm*—Donald A. Bergquist

(57) ABSTRACT

An electrical device such as an outlet receptacle or a signal cable receptacle are mounted in a recessed relationship to a wall to allow a flat cover plate to be removably applied, thereby to create an aesthetic appearance concealing the device and to protect it from abuse when the electrical device is not in use, especially abuse caused by children inserting foreign objects into the device. One result of this invention is added safety from electrical shock hazzard from plugs that are partially inserted into an electrical outlet housed in the apparatus of this invention. Additionally, the concealment and protecting features of the flat cover plate used in this invention can be extended to flush-mounted electrical devices.

21 Claims, 4 Drawing Sheets

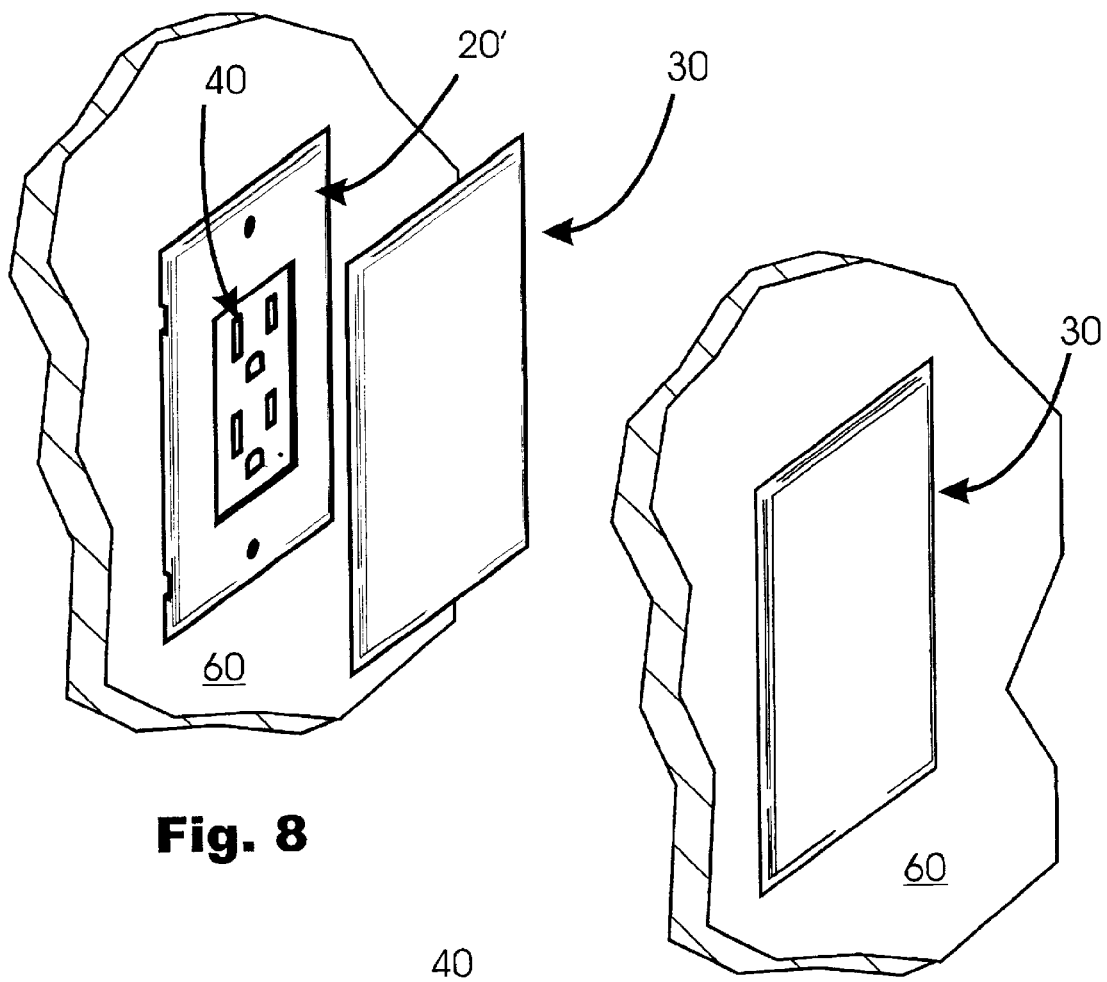
Fig. 8
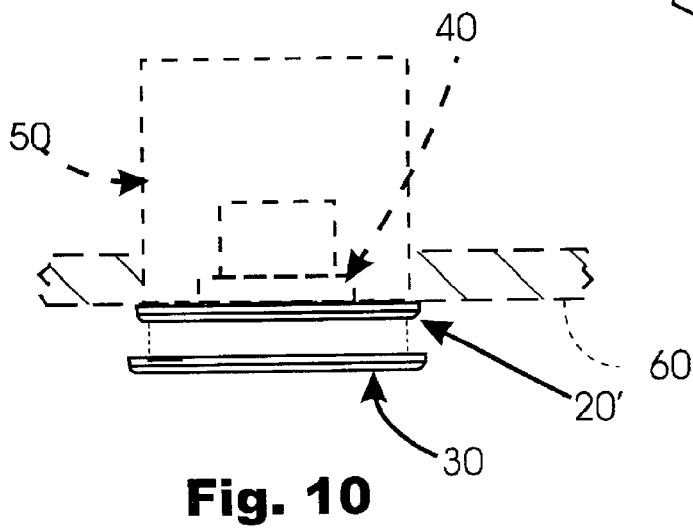
Fig. 10
Fig. 9
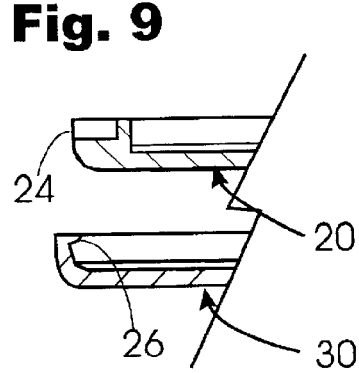
Fig. 11

APPARATUS FOR RECESSING AN ELECTRICAL DEVICE IN A WALL

BACKGROUND OF INVENTION

This disclosure relates to boxes for housing electrical connections, particularly for audio, video, and electronic communications devices, but the disclosure includes a housing useful for housing receptacles for 110-volt household current as well. The disclosure relates to providing means for covering receptacles and especially covering receptacles for providing network connections to communications and entertainment equipment. Many such network connection receptacles include a portion that, by design, must protrude from a mounting plate, and to which a signal-carrying cable is connected. The connections are thus made to provide a secure connection while providing proper shielding of the signal-carrying wire or wires within.

New construction, whether for residential or business use, is often pre-wired for computer connections, video cable connections, audio cable connections, and the like. As a rule of thumb, it is typical to install outlets to such cables at several locations within each of several rooms to permit flexibility of using electronic equipment in various locations within the premises or within each room therein. To do otherwise requires the use of extension cables that may be unsightly and hazardous or the tedious installation of such wiring within the walls after the construction is finished. Surface-mounting of the wiring after construction is completed is an unattractive alternative, especially in residential installations.

In addition, the National Electrical Code (NEC), which recites requirements for new construction, now calls for each room to have multiple electrical receptacles spaced no more than ten feet apart around the perimeter of the room. Thus, the electrical receptacles with added communications/entertainment receptacles may be found by some people to be unsightly. Special power receptacles, as for uninterrupted power supplies or even locally-generated power, may have limited capacity and should not be used for appliances having high power requirements or, in some cases, even for lighting. Their intent may be to provide emergency power for electronic equipment to allow for proper shut-down upon failure of the central power source, but their performance may be degraded and their usefulness diluted if other, non-critical loads are applied to them.

There have been developed over several years a variety of connecting devices for providing on a substantially flush-mounted plate covering a junction box various detachable electrical connections for transmitting signals for communications. By design, some of these connecting devices protrude from a mounting plate, presumably to provide proper shielding of the signal-carrying wire or wires within. The protruding portions of these connectors are unsightly, particularly in locations where the connector is unused and not connected to a cable for signal transfer. The installation of such equipment in multiple locations in a room will almost invariably result in unused receptacles that may be seen as unsightly. In addition, the protruding portions of these connections are a potential hazard to personnel who may brush against them and are subject to damage during the process of moving furniture close to the wall within the premises.

Perhaps more importantly, any of these receptacles present an attractive point of concentration for toddlers who seem all too eager to find cavities or holes into which they like to insert small objects, such as crayons, bits of clay, paper, or even food, paper clips, knives, keys, and the like. Covering all unused receptacles appears to be nothing short of mandatory for parents.

One obvious solution is to provide a domed cover that would enclose and hide the unsightly protruding connectors, but such a cover may be seen itself as unsightly and it would remain somewhat of a hazard in that it protrudes into the room.

For recessing an electrical outlet for use behind an electrical wall clock, at least one manufacturer provides a cover plate having a recess. The electrical junction box is mounted in the usual fashion, with its open face flush with the outer surface of the wall, which is a requirement of the NEC. The 'device', the electrical outlet, thus intrudes more deeply into the junction box, but there is still sufficient space within the junction box for the required wires and connectors, the insulated copper wires being capable of bending to a rather sharp radius without causing failure. The communications cables toward which we address our attention here are not so amenable to making sharp bends without damaging their integrity. They cannot be forced into the confined space that would result from merely recessing the connection receptacles into a standard electrical junction box. A deeper box would have to be used, but electrical contractors are disinclined to keep in their job site inventory junction boxes of varying depths.

It is desirable that a single product be used for both low-voltage receptacles and receptacles supplying household current, usually in the range of 110 to 130 Volts at 50 to 60 Hertz. The NEC prohibits the obvious solution to this problem, that of recessing the receptacles by merely mounting a standard electrical junction box flush with the inner surface of the drywall panel forming a wall and using a recessing trim plate or escutcheon mounted on the outer surface of the panel. This solution would result in a box that is not totally enclosed as it would have a rim of drywall (plasterboard) around the opening under the escutcheon. The NEC requires that all junction boxes be completely enclosed, leaving no exposure to flammable materials, so this solution is unsuitable as not meeting NEC standards.

As used herein, the term 'electrical device' means any electrical receptacle, electrical connector, or electrical switch connectable to an electrical distribution system for distributing power, data, or other signal by hard-wire means through wires or cables attached to the same.

SUMMARY OF INVENTION

Thus, the present invention provides a frame adapted to cooperatively mate with and permanently connect with the open face of a standard electrical junction box that is to be mounted approximately flush with the inner surface of wallboard comprising the wall of a room, the frame thereby to extend the effective depth of said junction box to provide adequate space for non-crimping bends in the cable connections to the back of an electrical device or devices mounted therein when such electrical device is installed in said junction box, and the frame thereby further providing the required complete containment of all electrical wiring. Also, as a part of the system provided herein is a escutcheon plate having a recessed center adapted to cooperatively engage an electrical device for the complete encasing thereof to meet the NEC and standards prescribed by the Underwriter's Laboratory (UL). As a final feature of the invention, a removable cover plate is adapted to completely cover the escutcheon plate to create an unobtrusive appearance when the electrical device is not in use, said cover plate further protecting the electrical device from the insertion of foreign materials.

In an alternative use, the frame of this invention can be used within the guidelines of the NEC and UL for only low-voltage and fiber-optic connections without using a junction box where the NEC does not require wiring to be totally contained within a box. The frame is adapted to be attached to the side or the face (or both) of a wall stud, usually of standard "two by four" lumber (much new construction now uses "two by four" studs made of steel extrusions), by affixing selectively removable flanges. These flanges are, in the preferred mode, integrally molded as a part of the frame with snap lines adjacent the frame for easy removal of unwanted or unneeded flanges. In such an installation, the flange fixedly supports the frame and the frame fixedly supports the electrical device and the aforesaid escutcheon plate; the escutcheon plate removably supports the aforesaid cover plate, when such cover plate is used.

BRIEF DESCRIPTION OF DRAWINGS

FIG. 8 illustrates a flush-mounted electrical device using a flush escutcheon and the cover plate of this invention.

FIG. 9 illustrates how this invention appears when installed and covered with a cover plate.

FIG. 10 further illustrates the arrangement of FIG. 8 in a schematic form.

FIG. 11 illustrates a detail in the cover plate and the escutcheon plate in a cross-sectional view.

DETAILED DESCRIPTION

The figures attached hereto show the various features of this invention but are not drawn to scale. The purpose is to show the features with a clarity that can best be shown by enlarging the features. Throughout the drawings, like elements are labeled with the same number in each view.

Figure 1:
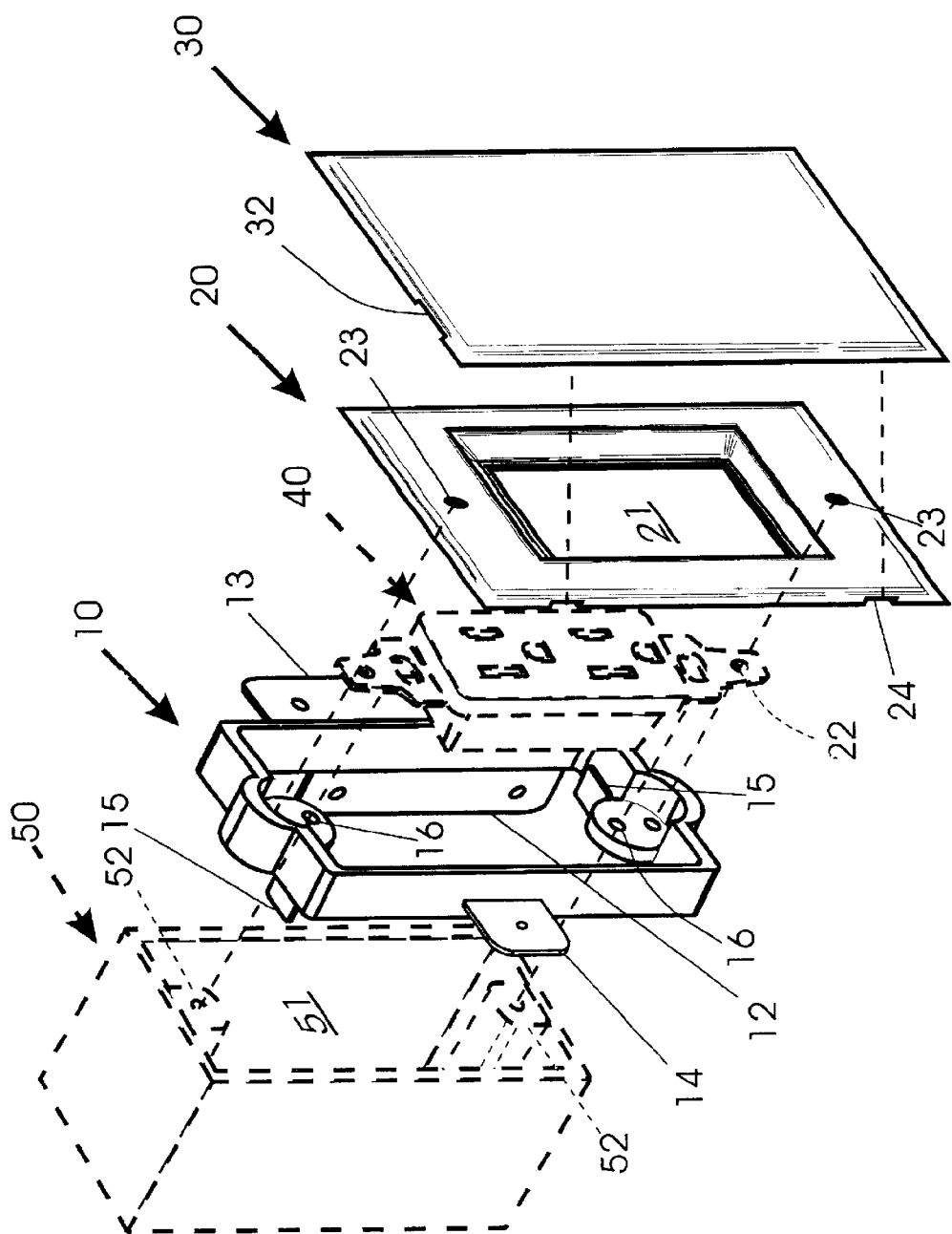
FIG. 1 is a perspective view of the three elements of this invention showing a high-voltage electrical device.

FIG. 1 illustrates the three elements of this invention in a perspective view with an electrical device and junction box shown in phantom. The three elements are the frame 10, the escutcheon plate 20, and the cover plate 30.

The frame 10 is adapted by means of integrally molded selectively removable flanges 12 and 13 that form a right angle therebetween to be affixed to one or two surfaces of a supporting construction member, usually a wall stud of nominally two by four inch lumber. Either or both flanges may be removed as dictated by the particular installation. Such will be discussed later in this disclosure.

The escutcheon plate 20 is comparable to a normal receptacle cover plate for electrical devices of the style known in the trade as DECORA, except that the plate includes a central opening 21 having a periphery that is recessed by one-half inch, nominally, thereby adapted to frame and engage the periphery of the outer surface of an electrical device securely mounted in a recessed manner in the frame 10. The escutcheon plate 20 is affixed to the electrical device 40 by countersunk screws that are not shown but are the same as used in the trade for such attachment and engage threaded holes as at 22.

The cover plate 30 is a blank plate that is substantially flat with rounded edges similar to a blank cover plate sometimes used in the trade to cover unused junction boxes, but this cover plate is of a larger size, sufficient to cover the periphery of escutcheon plate 20 and it has no provision for mounting screws. Rather, the cover plate 30 has integrally-molded protrusions 26 that cooperatively engage recesses 24 in the periphery of escutcheon plate 20 as shown in detail in FIG. 11, thereby for the cover plate to be removably retained on the escutcheon plate in what might be called a "snap action." A notch 32 in one edge provides a means to apply leverage with a screwdriver or a coin to snap off the cover, thereby to gain access to the electrical device. The plate is normally applied with the notch positioned on the lower edge to conceal it. With the cover plate thus installed, the installation presents a discreet appearance. As an option, the cover plate can be painted or covered to match the wall in which the installation is made, thereby further enhancing its appearance.

It is obvious that in the case of a standard flush-mounted receptacle, a normal, flat escutcheon plate could be provided with notches 24 for engaging a cover plate 30 to similarly cover the flush-mounted receptacle, providing a safe, discreet, and attractive covering for unused receptacles. This option is of primary concern in a household having children.

The installation illustrated in FIG. 1 is for an electrical device 40 for carrying household current, which we will refer to as an AC device, alluding to "alternating current." The AC device itself is not a part of this invention, but it and its use must be described here to understand the invention. When such an AC device is installed, the NEC requires that the wiring be completely enclosed to separate it from any flammable materials, including construction materials of which walls are normally made. This is clearly a safety requirement. Thus, a junction box 50 is required by the NEC.

The junction box 50 is not a part of this invention but needs here to be described for understanding the invention. The junction box is a generally rectangular box having one face 51 that is almost completely open for the installation of an electrical device therethrough for containment within the box. The junction box for use with this invention is preferably of plastic for the various design features of modem plastic junction boxes. The one open face has a boss with a threaded hole 52 at the top and bottom edges for affixing the electrical device for support thereof within the opening in the box. A requirement of the NEC is that any AC device be totally supported by the box and within confines of the box. Further, after the electrical device is installed, the opening must be covered, leaving only the face of the electrical device exposed for use thereof. At least one of the nominally closed faces is adapted by means of holes, clips, and other details for receiving cables, wires, and the like for connecting within the box to an electrical device mounted therein.

Figure 2:
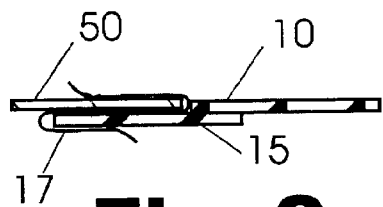
FIG. 2 illustrates attachment means for joining the invention to a junction box by a cross-sectional view.
Figure 3:
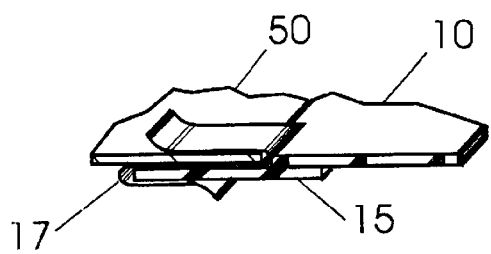
FIG. 3 illustrates attachment means for joining the invention to a junction box by a combined perspective and cross-sectional view.

In the invention in this embodiment, the frame 10 is adapted to be permanently joined to the junction box 50 in a manner wherein the top and bottom edges are in registry with alignment tabs 15 engaging the box to ensure alignment and spring clips 17 that firmly engage the alignment tabs 15 and the edge of the box 50 to hold them in substantially permanent engagement by means of spring tension and barbs on the spring clips. This feature has been made to satisfy the NEC code for 110-volt installations to be totally enclosed. Physical support of the frame comes from its direct attachment to the stud 62. Details of one of these alignment tabs 15 showing the spring clip 17 attached and the edge of the box 50 are shown in FIG. 2 and FIG. 3. Any of a myriad of known fastening means could be used with success instead of using a spring clip as shown. The clip shown represents an economical and convenient means.

Figure 5:
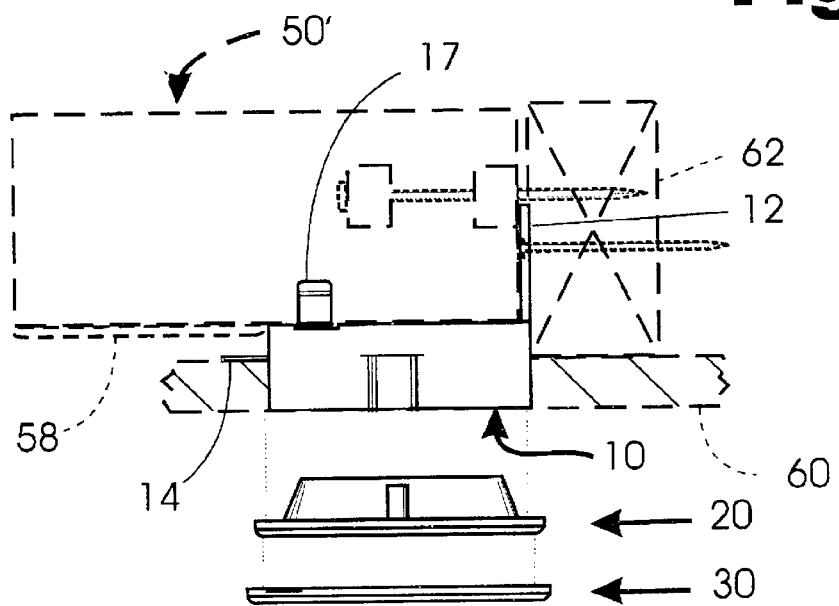
FIG. 5 illustrates a top view of the invention as it would be used with a high-voltage electrical device.

A typical installation of a double-ganged box 50' is shown in FIG. 5. It must be noted that these alignment tabs 15 and spring clips 17 engage only the top and bottom surfaces of the box 50. It is evident, then, that the box 50 could be a single box as indicated in FIG. 1, or it could be a double-ganged box 50' as indicated in FIG. 5, capable of receiving two electrical devices of the type illustrated at 40 or 70. Also, it could be a triple-ganged box or larger. These larger boxes would be particularly useful in containing more robust cables as might be used to carry a plurality of wires and optical fibers, some of which are of limited flexibility or should not be bent around a small radius. In each of the multiple-ganged boxes, the NEC code requires cover plates 58 over the front face of any unused spaces if any household power is provided within the box. A conscientious installer may well provide such cover plates in low-voltage installations also, for the added safety it would provide, especially if there is any suggestion that a household current circuit might be added later to the installation. (they are) is it is, (are) is is, Delete (and is not needed to support the frame)

In the embodiment illustrated in FIG. 5, wherein the junction box 50' is well and properly anchored to an adjacent wall stud 62, the flange 13 is to be broken off and discarded as it is in the way and is not needed to support the frame 10. Support comes from flange 12 and clips 17 maintain alignment with the junction box 50'. Adaptation for further support of the frame 10 is achieved in this embodiment by providing threaded holes 16 in the frame 10 through which screws (not shown) for mounting the electrical device 40 in the box 50. The screws used here are to have a root portion of the shank having a reduced diameter and lacking threads and the distal portion of the shank having threads to engage the threaded mounting hole in the junction box while the threads do not engage the frame 10. Such screws are not uncommon in the trade and need not be further described here. For the present installation, this means of mounting the electrical device satisfies the requirements of the NEC and UL guidelines that any AC device be mounted securely to the junction box directly and not receive its support from the escutcheon plate; the frame 10 is snugly trapped between the electrical device 40 and the box 50. Notice that this mounting puts the plane of the face of the electrical device recessed within the frame. The escutcheon plate 20 is adapted by the providing of holes 22 to receive screws (not shown) that engage threaded holes in the tabs used for mounting the electrical device in the box. The escutcheon plate 20 is thus mounted to the AC device and does not supply support thereto, but the inner periphery of the central hole 21 in the escutcheon plate engages the periphery of the face of the electrical device 40, thereby to totally cover and enclose the electrical connections thereto and leaving the face thereof, to which connectors may be removably inserted, recessed below the surface of the escutcheon plate, by a nominal one-half inch.

It should be noted in this embodiment, employing an AC device, it is nearly impossible to make contact with prongs of any plug that is only partially inserted into the electrical device 40. It is especially important that a flat object, such as a knife blade or metal strip cannot be slid between the face of such a plug and the face of the AC device whose surface is recessed in this manner. Thus, this apparatus creates an especially safe receptacle for supplying household current in a room where children may be present.

In addition, when the AC device is not in use, or when unused receptacles appear the least bit distracting or unattractive, the cover plate 30 may be installed by snapping it onto the escutcheon plate 20. In addition to presenting a more attractive appearance, the cover plate 30 can be seen to be a safety device, covering outlets that may be attractive to infants to insert foreign objects into any holes therein.

Having now fully described the application of the present invention to the installation of an AC device, we also point out that the NEC does not require a junction box for the installation of low-voltage and fiber-optic lines to a connector or receptacle. Modular connectors are currently made to fit into the same DECORA-style electrical devices in very flexible arrangements. These DECORA-style electrical devices are made to receive one to six such modules for various low-voltage outlets, such as speaker cables, data cables, pone cords, and optical cables employing fiber optics. The flexibility of such systems yields a multitude of combinations; any manufacturer's module may be used.

Figure 4:
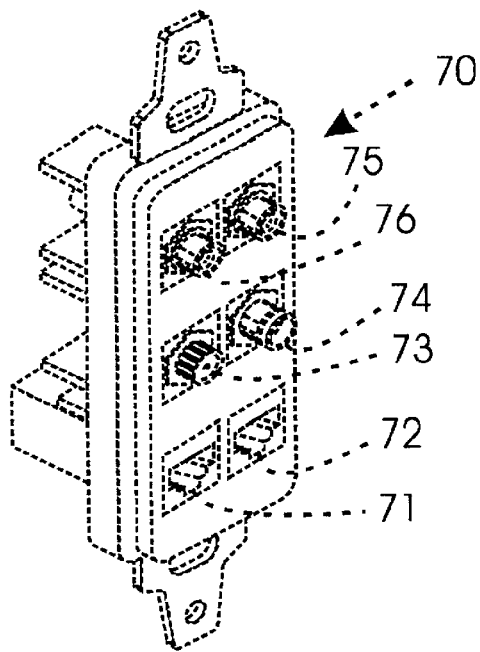
FIG. 4 illustrates a low-voltage electrical device to be used with this invention in perspective view.

For purposes of this description, the low-voltage electrical device is a DECORA-style support unit that can receive one to six modular connectors in a flat-faced or planar configuration parallel to the face of a wall in which it is installed and is designed for support thereof in a junction box. Such a low-voltage electrical device 70 is illustrated in FIG. 4 and though it is not a part of this invention, it must be discussed to understand the useful features of the present invention.

This type of electrical device is made to receive any of a variety of modular connection devices, each specifically designed for a certain type of connection. Among the more common are:

RJ-11 four- or six-wire connectors, usually for telephone and some computer connections, as at 71;

RJ45 connectors, eight-wire connector used commonly to connect computers onto a local-area networks (LAN), especially Ethernet, using what is referred to as "CAT-5", or "Category 5" cable comprising twisted wire pairs, as at 72;

RCA connectors, usually used for analog signals in the audio frequency range, as at 73;

fiber optics connectors of a variety of types for information transmission through a fiber optics line, as at 74 and 75;

coaxial connectors, usually used for transmitting television and computer signals via a coaxial cable, as at 76.

Within each of these types, a variety of designs may exist, especially in cases in which standardization has not yet occurred. Several manufacturers make modular elements for these low-voltage applications and they are readily available in the industry.

Significant to this invention is the fact that the same apparatus that has been described as useful in providing the installing of a recessed AC device is useful in another mode for installing of a well-supported recessed low-voltage electrical device. This is clearly a convenience for the professional electrician installing both AC and low-voltage electrical devices. It is an advantage for the designer to be able to offer receptacles that provide a uniform appearance within a room.

The present invention is well adapted for supporting and mounting low-voltage electrical devices, also, in a recessed relationship to the surface of a wall. Indeed, it was for this purpose and this mode for which the invention was first conceived. In this mode, it is particularly adapted for use both in new construction and in retrofitting into existing walls.

Let us first consider the installing of the present invention in new construction, wherein the framing of the building is completed, but wallboard has not yet been installed to enclose the rooms. It is at this phase of building construction that electricians can most easily install extensive wiring that will subsequently be covered by the wallboard.

Wherever a low-voltage electrical device is to be installed, the electrician can mount only the frame 10 of this invention on a wall stud. The frame is adapted by means of flanges 12 and 13 to be affixed to such a stud for support. Depending upon the specifics of the particular installation, either of these flanges may be broken off by hand. More specifically, if the installer is concerned that flange 13—which is intended to be mounted on the front surface of a wall stud to easily establish the depth at which the frame 10 is mounted to put the front edge flush with the surface of later-installed wallboard—may interfere with the proper setting of the wallboard by causing a bulge where the wallboard lies atop the flange 13, then that flange may easily be removed. The installer may use nails, screws, or other means to fasten flange 12 to the side surface of the stud.

Figure 6:
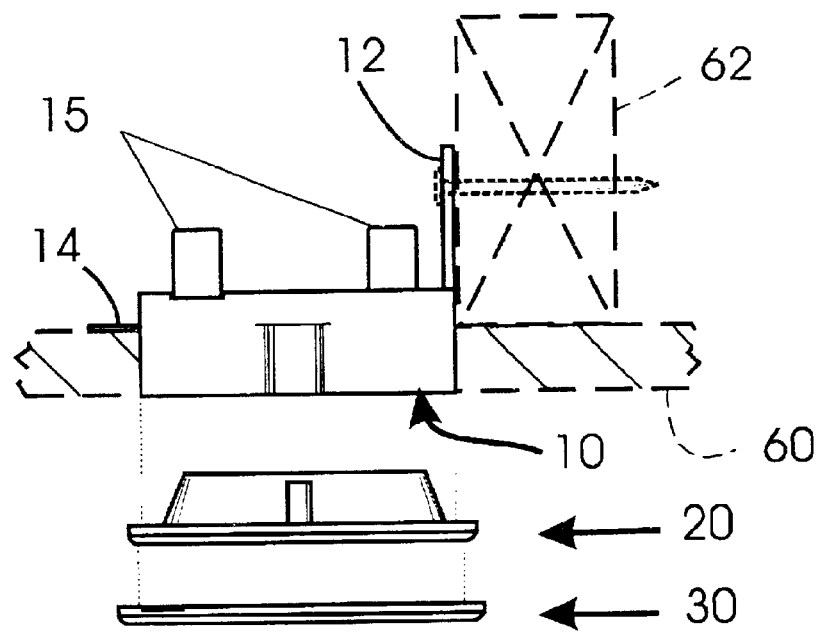
FIG. 6 illustrates a top view of the invention as it would be used in one manner with a low-voltage electrical device.

FIG. 6 illustrates mounting the frame 10 against a wall stud 62 without a box, for use with a low-voltage electrical device. The flange 12 provides support to the frame 10 and flange 14 establishes the proper depth for the face of the frame to be flush with the surface of the wall 60. The escutcheon 20 is affixed to the frame 10 with screws and the cover plate 30, when it is used, may be snapped onto the escutcheon plate 20.

Figure 7:
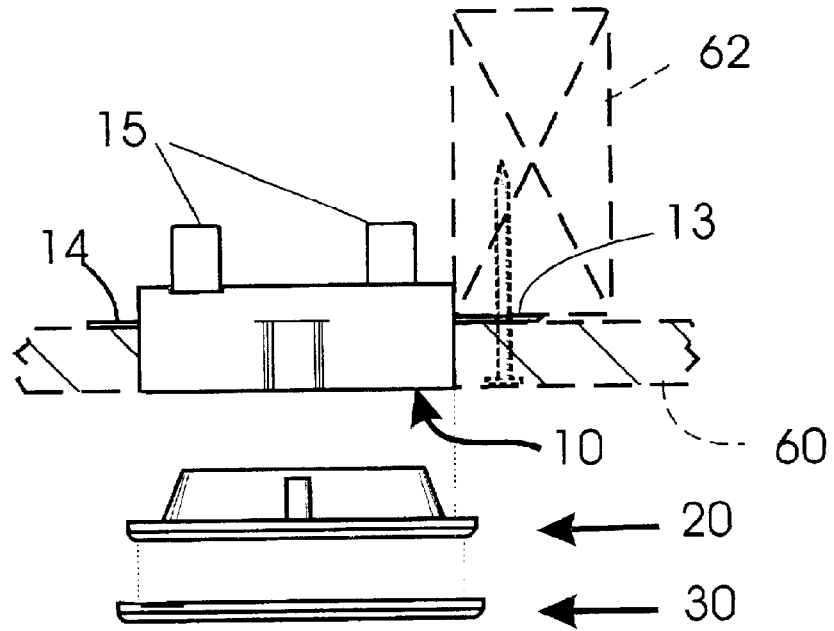
FIG. 7 illustrates a top view of the invention as it would be used in a second manner with a low-voltage electrical device.

If there is a reason the installer wants to support the frame only on the front face of the stud, he may opt to break off flange 12 and attach only flange 13 to the stud. The front surface of tab 14 is in the same plane as the front surface of flange 12, as is illustrated in FIG. 7, and the two act to establish the proper depth to make the face of the frame 10 flush with the surface of the wall 60. The nailing can be done before the wallboard is placed on the stud or it can be done after the wallboard is installed, as is shown in the figure. The former would be done in new construction.

Installing the present invention in existing construction is also possible and quite easy. In one example, the frame may be used in installing a low-voltage electrical device in a finished wall. First one would cut the required hole in the wallboard adjacent a stud. Then, flange 12 would be broken off, leaving flange 13 intact. The frame 10 can then be inserted endwise into the hole, turned behind the wallboard to insert flange 13 between the stud and the wallboard, pulling the other edge of the frame 10 forward to bring it flush with the face of the wall with tab 14 contacting the back of the wallboard. Nails or screws passing through the wallboard and flange 13 secure the frame in the installed position for mounting of the low-voltage electrical device, the face of which will be recessed a nominal one-half inch. Once the frame 10 is secured, the electrical device can be wired and installed in the frame and the escutcheon plate 20 can be installed for an active installation and the cover plate 30 can be snapped onto the escutcheon plate for an inactive installation.

Yet another application for which a recessed and covered electrical device would be desired is a wall switch for a circuit that is to remain on or off. Using this invention, the recessed switch would be less likely to be operated accidentally or inadvertently and with the recessed switch covered by the cover plate of this invention, access to the switch must be deliberately achieved.

A natural extension of the cover plate 30 of this invention is its use on flush-mounted electrical devices as well as recessed electrical devices. In such use, concern for safety as well as aesthetics is present. A covered outlet is not the subject for curious children's poking and prodding. Such a flush-mounted installation is illustrated in FIGS. 8, 9, and 10. The electrical device 40 is installed in a junction box 50 and is flush with the wall surface 60, as is done in the usual installation. Escutcheon plate 20' is much like a standard escutcheon plate for DECORA-type electrical devices, but it has notches 24' for receiving the cover plate 30 of this invention.

Now, having described my invention by using specific examples thereof, variations thereof will be obvious to one skilled in the art. For example, this invention has been described for application with DECORA-style electrical devices; this has been done for convenience and should not be inferred as a limitation of the invention. I desire protection by letters patent limited only by the claims appended hereto.

I claim:

1. Apparatus for recessing a substantially flat-faced electrical device mounted in a wall, said apparatus comprising:
   a frame having an open front and an open back and adapted to be mounted alternatively by means of a first flange to a side of a wall stud, which side of said wall stud is perpendicular to said wall, and by means of a second flange to face a of the wall stud, which face abuts said wall, said frame adapted to receive said electrical device with the flat-face thereof in a substantial recessed relationship, nominally one-half inch, with respect to the surface of said wall with said open front of said frame being substantially coplanar with the surface of said wall;
   a escutcheon plate having an outer rim for engaging the surface of said wall and also having a recessed open center portion adapted to engage and frame said electrical device, to which said escutcheon plate is adapted to be removably attached.

2. The apparatus of claim 1 further comprising a removable cover plate that cooperatively engages and removably attaches to said escutcheon plate to cover and protect said electrical device when it is not in use.

3. The apparatus of claim 2 wherein said escutcheon plate has peripheral notches to receive protrusions on said cover plate to provide for removable attachment thereof.

4. The apparatus of claim 1 further comprising, at least one tab adjacent and integral with an edge of said open back of said frame and extending in a rearward direction therefrom and a fastening means on said tab, said tab thereby adapting said edge for aligning with, engaging with, and fastening to at least one edge of an open face of an electrical junction box used to enclose the back of said electrical device.

5. The apparatus of claim 4 wherein said fastening means comprises a spring clip.

6. The apparatus of claim 4 further comprising a removable cover plate that cooperatively engages and removably attaches to said escutcheon plate to cover and protect said electrical device when it is not in use.

7. The apparatus of claim 6 wherein said escutcheon plate has peripheral notches to receive protrusions on said cover plate to provide for removable attachment thereof.

8. Apparatus for recessing a substantially flat-faced electrical device mounted in a wall, said apparatus comprising:
- a frame having an open front and an open back and adapted to be mounted by means of a flange to a side of a wall stud, which side of said wall stud is perpendicular to said wall, said frame adapted to receive said electrical device with the flat-face thereof in a substantial recessed relationship, nominally one-half inch, with respect to the surface of said wall with said open front of said frame being substantially coplanar with the surface of said wall;
- a escutcheon plate having an outer rim for engaging the surface of said wall and also having a recessed open center portion adapted to engage and frame said electrical device, to which said escutcheon plate is adapted to be removably attached.

9. The apparatus of claim 8 further comprising a removable cover plate that cooperatively engages and removably attaches to said escutcheon plate to cover and protect said electrical device when it is not in use.

10. The apparatus of claim 9 wherein said escutcheon plate has peripheral notches to receive protrusions on said cover plate to provide for removable attachment thereof.

11. The apparatus of claim 8 further comprising, at least one tab adjacent and integral with an edge of said open back of said frame and extending in a rearward direction therefrom and a fastening means on said tab, said tab thereby adapting said edge for aligning with, engaging with, and fastening to at least one edge of an open face of an electrical junction box used to enclose the back of said electrical device.

12. The apparatus of claim 11 wherein said fastening means comprises a spring clip.

13. The apparatus of claim 8 further comprising a removable cover plate that cooperatively engages and removably attaches to said escutcheon plate to cover and protect said electrical device when it is not in use.

14. The apparatus of claim 13 wherein said escutcheon plate has peripheral notches to receive protrusions on said cover plate to provide for removable attachment thereof.

15. Apparatus for recessing a substantially flat-faced electrical device mounted in a wall, said apparatus comprising:
- a frame having an open front and an open back and adapted to be mounted by means of a flange to a face of a wall stud, which face of said wall stud abuts said wall, said frame adapted to receive said electrical device with the flat-face thereof in a substantial recessed relationship, nominally one-half inch, with respect to the surface of said wall with said open front of said frame being substantially coplanar with the surface of said wall;
- a escutcheon plate having an outer rim for engaging the surface of said wall and also having a recessed open center portion adapted to engage and frame said electrical device, to which said escutcheon plate is adapted to be removably attached.

16. The apparatus of claim 15 further comprising a removable cover plate that cooperatively engages and removably attaches to said escutcheon plate to cover and protect said electrical device when it is not in use.

17. The apparatus of claim 16 wherein said escutcheon plate has peripheral notches to receive protrusions on said cover plate to provide for removable attachment thereof.

18. The apparatus of claim 15 further comprising, at least one tab adjacent and integral with an edge of said open back of said frame and extending in a rearward direction therefrom and a fastening means on said tab, said tab thereby adapting said edge for aligning with, engaging with, and fastening to at least one edge of an open face of an electrical junction box used to enclose the back of said electrical device.

19. The apparatus of claim 18 wherein said fastening means comprises a spring clip.

20. The apparatus of claim 18 further comprising a removable cover plate that cooperatively engages and removably attaches to said escutcheon plate to cover and protect said electrical device when it is not in use.

21. The apparatus of claim 20 wherein said escutcheon plate has peripheral notches to receive protrusions on said cover plate to provide for removable attachment thereof.

\* \* \* \* \*